April 15, 1958 C. F. MATTKE 2,831,055
OPTICAL APPARATUS FOR CONTINUOUS MOTION
MULTIPLE FILM PROJECTOR
Filed June 30, 1953 3 Sheets-Sheet 3

INVENTOR
C. F. MATTKE
BY Hugh S. Wertz
ATTORNEY

# United States Patent Office 2,831,055
Patented Apr. 15, 1958

2,831,055

OPTICAL APPARATUS FOR CONTINUOUS MOTION MULTIPLE FILM PROJECTOR

Charles F. Mattke, Fanwood, N. J., assignor to Bell Telephone Laboratories, Incorporated, New York, N. Y., a corporation of New York Application June 30, 1953, Serial No. 365,121

4 Claims. (Cl. 178—7.1)

This invention relates to devices which permit optical projection systems to image continuously moving film and more particularly to an arrangement of such devices for use successively or simultaneously in a plurality of image projection systems.

It is an object of this invention to simplify the equipment required to image continuously moving film.

Television transmitting has been standardized at thirty frames (or sixty fields) per second. Motion picture film, however, is recorded at twenty-four frames per second. In order to televise motion pictures, these two rates must be reconciled. Such reconciliation has been accomplished in the past through the use of storage type television camera tubes in combination with synchronized film "pulldown" mechanisms. The timing requirements on the mechanical systems and the film positioning have been such that reliable operation is difficult to obtain. On the other hand, the tonal quality of the pictures produced with the storage type camera tube is not as good as that produced by systems using the spot scanning tube and photo-cell.

In a copending application, Serial No. 124,403, filed October 29, 1949, now U. S. Patent #2,718,549, dated September 20, 1955, the present applicant disclosed a device entitled "Continuous Film Motion Projection for Television Camera and Film Recorders." One of the advantages of that invention is that it permits standard motion picture film to run at twenty-four pictures per second while it is being scanned at sixty fields per second for television transmission. Other uses of this projector are the recording of programs directly from a television receiver on standard motion picture film at twenty-four pictures per second, and, of course straight-forward motion picture projection.

The continuous projector comprises, essentially, a rotary drum covered with a crown of mirrors. Each mirror is mounted on its own axis which is fastened to a cam follower. A stationary symmetrical cam is mounted beside the rotary drum on the same axis as the drum. In following this cam, the cam followers make the mirrors move so that the light beam, reflected from each mirror in turn, momentarily paces the film frame as it moves smoothly through a curved film gate. The light, and not the film, then, gives the intermittent action necessary for proper viewing.

More information on the continuous projector may be found in the above-mentioned application, and in the paper entitled "Continuous Motion Picture Projector for Use in Television Film Scanning" by A. G. Jensen, R. E. Graham and C. F. Mattke, published in the Journal of the Society of Motion Picture and Television Engineers, vol. 58, pp. 1–21, January 1952.

Usually at least several reels of film are required to show a complete motion picture program. Thus at least one change of reels is necessary. To accomplish this change, motion picture theatres have long used two complete projectors coupled through various devices to facilitate a smooth change-over.

Even one continuous projector, however, is extremely expensive and using two of them to permit reel-changing might be prohibitively so. Since the complex and carefully machined mirror drum is the prime contributor to this expense, if the same drum were used in conjunction with two, three, or more image projection systems there would be a great saving in cost.

It is the principal object of this invention to adapt the continuous projector for use successively or simultaneously with a plurality of image projection systems.

In the construction of the particular continuous projector described in the above-mentioned application, the stationary cam was ground symmetrically even though only a small portion of the cam contour was needed. An asymmetrical cam, it was found, introduces serious vibrations. However, it was discovered that such a symmetrical cam also puts the mirrors twice through the special motion required to make the light beam intermittently pace the continuously moving film.

This latter feature makes the continuous projector lend itself admirably well to use in two image projection systems. An extension of this thought to the design of particular cams leads to the use of three, four, or more image projection systems arranged around a rotary mirror drum.

Other objects of this invention will become apparent from a consideration of the illustrative specific embodiments shown in the drawings, in which.

Figure 1:
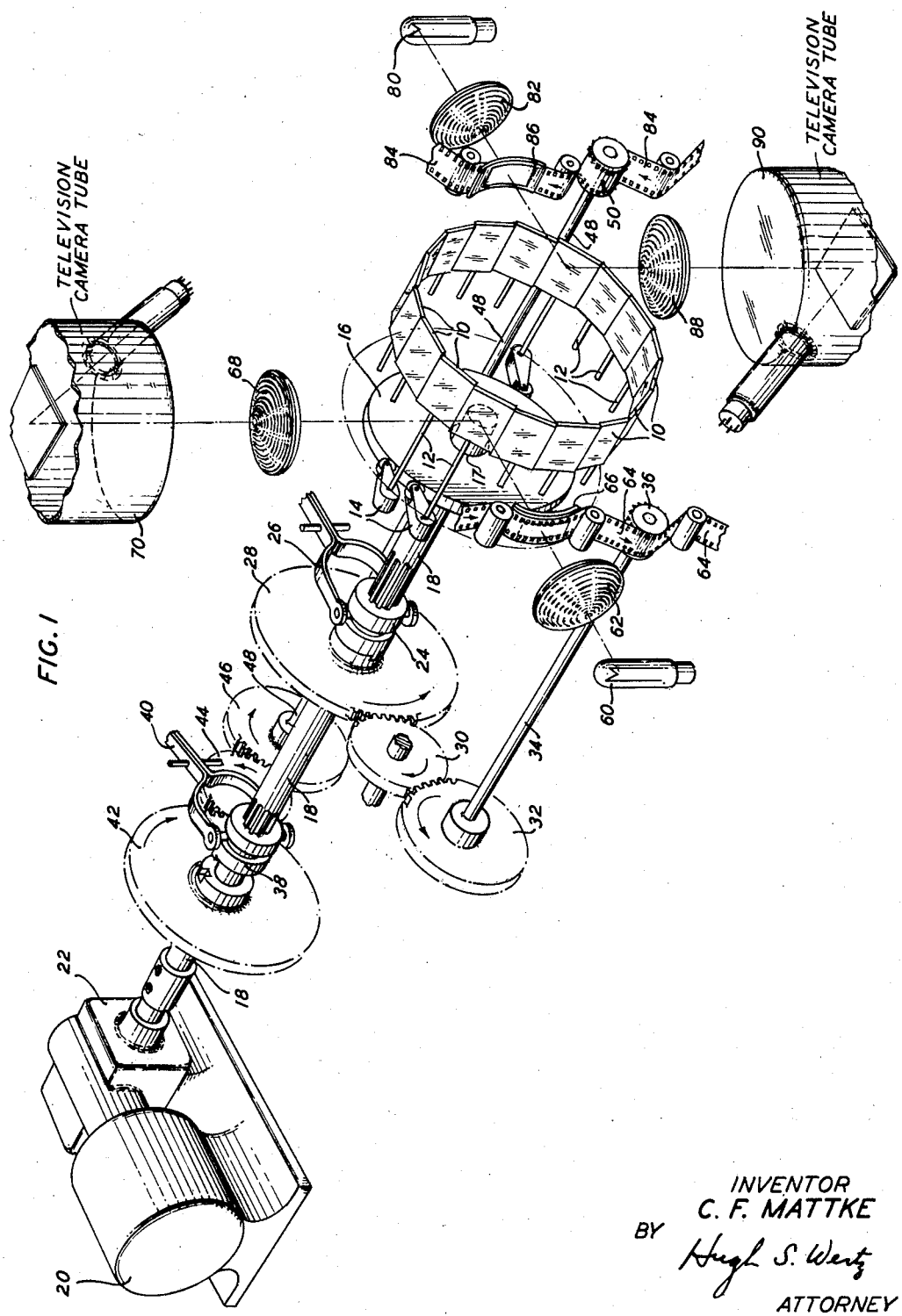
Fig. 1 is a perspective view, in schematic form, of a specific embodiment of the invention having two film projection systems for television transmission and coupling film drives therefor.

More detailed consideration will now be given to the drawings. Fig. 1 shows all of the important elements of the invention in an illustrative specific embodiment. For convenience, the rotary array of mirrors, the cam followers, and the cam, shown in schematic form, are taken from the above-mentioned copending application.

Each plane mirror 10 is mounted on an axis 12, which is attached to a cam follower 14. The cam followers 14 roll on the contour of the stationary cam 16. The axes 12 are held by a rotary drum (not shown) which is turned by the drive shaft 18 coupled to an electric motor 20 through a gear reduction box 22. Shaft 18 passes through the hole 17 in cam 16 without contact.

The lever 26 operates a clutch 24 which is turned by shaft 18. When the clutch 24 is engaged with the idler gear 28, the train of gears 30 and 32 is put in motion. Through the shaft 34 these gears turn the film sprocket 36, thus transporting the motion picture film 64. Similarly, the lever 40 operates the clutch 38 which is turned by shaft 18. When clutch 38 is engaged with idler gear 42, the train of gears 44 and 46 is turned. The train drives the shaft 48 which turns the film sprocket 50, thereby transporting the film 84.

The lens 62 is used to direct light from a source 60 onto the film 64 riding through the curved gate 66. One of the mirrors 10, in the optical path, reflects the light passing through the film 64 toward lens 68, which focuses the film image onto a television camera tube 70. In the same manner, light from source 80 is directed by lens 82 onto the film 84 being transported through gate 86. One of the mirrors 10, in the optical path, reflects the light passing through the film 84 toward lens 88 which focuses the film image onto the television camera tube 90.

It is clear, then, that an operator can engage or disengage the film drives, successively or simultaneously. When both film sprockets 36 and 50 are turning, standard motion picture films 64 and 84 are transported continuously through the film gates 66 and 86, respectively.

Each mirror 10, as it comes to a position in the optical path defined by source 60, lens 62 and gate 66, is made to move in such a manner that the image of a film frame entering the gate 66 is reflected toward the camera tube 70. As that film frame moves through the film gate 66, the mirror 10 moves so as to hold the film frame image stationary on the camera tube 70 until the film frame leaves gate 66. Before the first film frame leaves gate 66, the next mirror 10 turns into position to repeat the process with the next film frame. For a brief period both film frames are imaged on the screen of tube 70. Then the first film frame fades out as the second comes up to full intensity; only the second film frame will be imaged, for a time, until a third film frame is superimposed upon it, and then supplants it. Similarly, film frame images of film 84 are reflected toward the camera tube 90.

This continuous process by which the film frames are each superimposed on their precedecessor and, of course, superimposed upon by their successor, is ideal for television scanning of motion picture film. The rate of film frame motion is wholly independent of the scanning rate. Any scanning rate may be immediately and conveniently used with any film frame rate. Although the rates referred to in the discussion of the specific embodiments shown in the drawings are always the standard rates, twenty-four picture frames per second and sixty fields per second, it is to be understood that this is done only for convenience.

Figure 2:
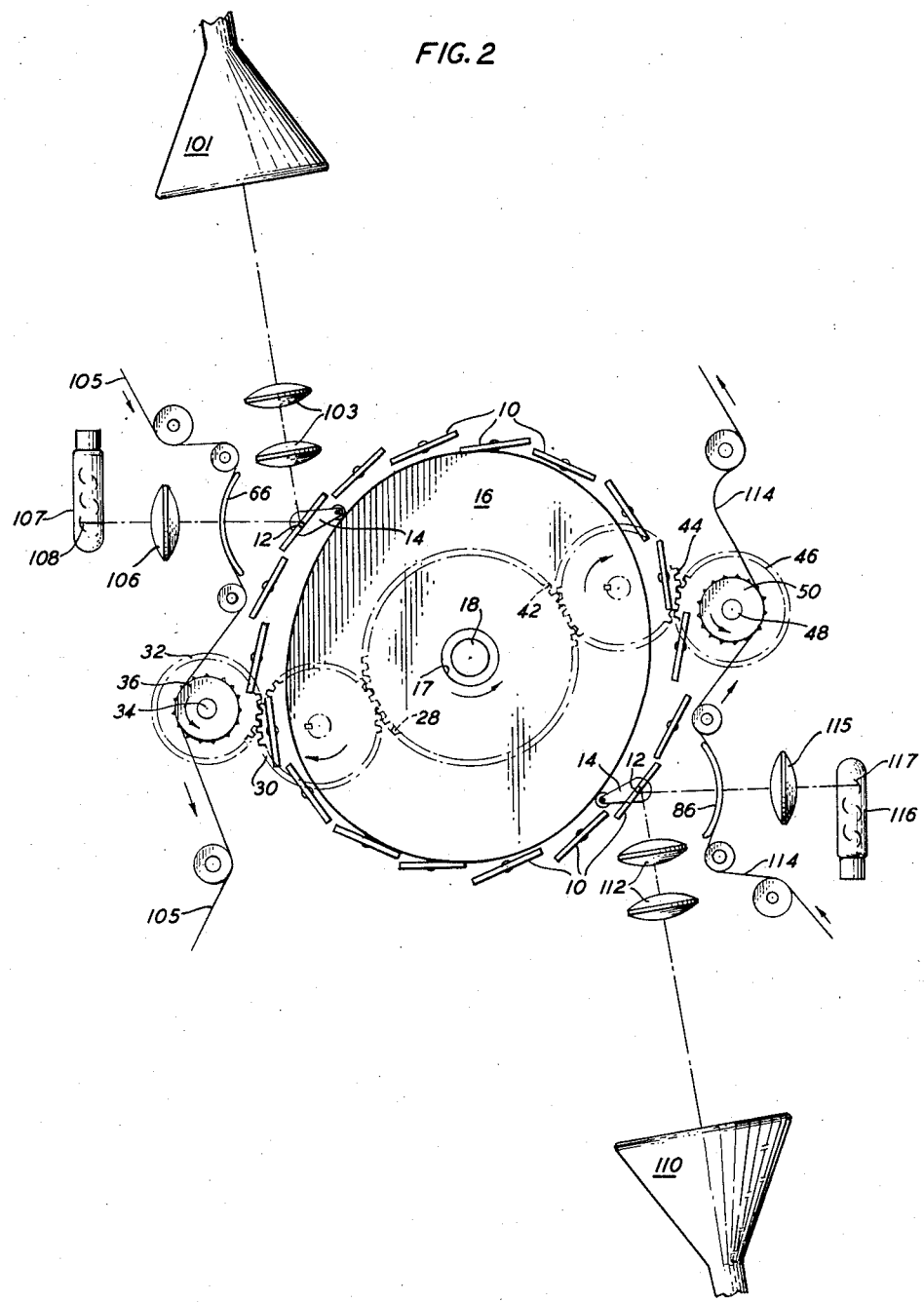
Fig. 2 is an elevational view, in schematic form, of a specific embodiment of the invention having two image projection systems each of which is suitable for either television recording or transmission.

Fig. 2 is a schematic representation of another specific embodiment of the invention. Most of the structure shown in Fig. 2 is the same as that shown in Fig. 1, as seen in an elevational view from the mirror drum side. Thus, the features and components designated 10, 12, 14, 16, 17, 18, 28, 30, 32, 34, 36, 42, 44, 46, 48, 50, 66 and 86 in Fig. 2 are those features and components correspondingly designated in Fig. 1 and described in connection with Fig. 1. It is understood that, although they are not shown, the motor 20, gear box 22, levers 26 and 40, and the clutches 24 and 38 would be included in the actual assembly of this embodiment.

Cathode ray tube 101 has a low persistence screen scanned in a raster pattern by an unmodulated electron beam. The image of the "flying stop" on the screen of tube 101 is focused, via one of the mirrors 10, by the lenses 103 onto the motion picture film 105 passing through gate 66. The condensing lens 106 is then used to direct light passing through the film 105 onto the plate 108 of the photo-multiplier 107. The photo-multiplier 107, of course, may be connected to a television transmitter. However, to convert this system into a television recording device it is necessary merely to change film 105 to unexposed film, and to make cathode ray tube 101 a television tube connected to a suitable television receiver circuit.

Cathode ray tube 110 also has a low persistence screen scanned in a raster pattern by an unmodulated electron beam. The image of the flying spot on the screen of tube 110 is focused, via one of the mirrors 10, onto the film 114 passing through the gate 86. The condenser lens 115 then directs the light passing through the film 114 onto the plate 117 of the photo-multiplier 116.

Again, by the simple expedient of making the tube 110 the picture tube of a television receiver and using unexposed film, the system may be used as a television recorder. Television programs received at sixty fields per second may be recorded at the standard motion picture rate of twenty-four pictures per second.

It is also apparent that the two image projection systems may be operated independently of one another, either simultaneously or successively. Furthermore, each system may be used, independently of the other, as either a television sending device or a television recorder.

Figure 3:
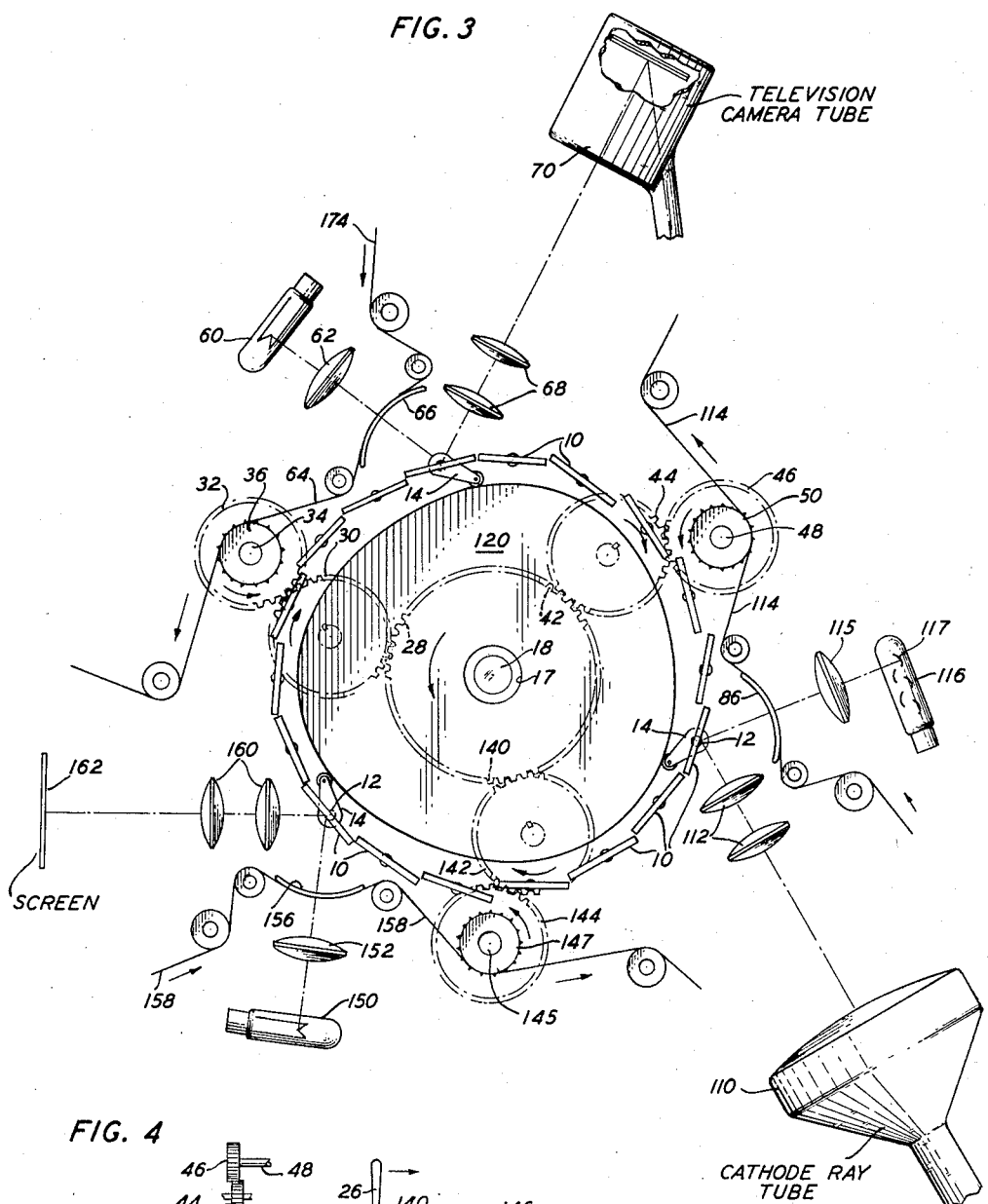
Fig. 3 is an elevational view, in schematic form, of a specific embodiment of the invention having three image projection systems, of which one is suitable for standard motion picture projection, another for television transmission, and a third for either television recording or transmission.
Figure 4:
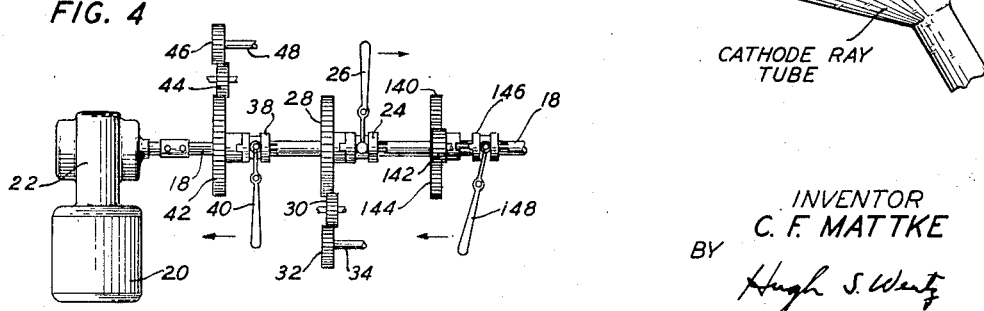
Fig. 4 is a partial elevational view, in schematic form, of a three-clutch drive system used with the embodiment of Fig. 3.

Figs. 3 and 4 show still another specific embodiment of the invention, illustrating the versatility of the basic concept. Here image projection systems are used, one for television sending of motion pictures, another for either recording television images on motion picture film or for television sending of motion pictures, and a third for motion picture projection. In the interests of clarity, much of the detail of the film and mirror drum drive mechanism has been omitted from Fig. 3 but has been shown in Fig. 4. Most of the features and components of the structure shown in Figs. 3 and 4 are similar to those of Fig. 1 or Fig. 2; such features and components therefore, are similarly designated.

Fig. 4 shows, on reduced scale, the drive mechanism for operating the film transport mechanisms and the mirror drum. A motor 20, operating through the reduction gear box 22, turns the drive shaft 18. This turns the clutches 38, 24 and 146, operated by the levers 40, 26 and 148, respectively. When clutch 38 is engaged with idler gear 42, the train of gears 44 and 46 moves and turns shaft 48, connected to the film transport sprocket 50 (Fig. 3). Clutch 24 may be engaged with idler gear 28 to turn the train of gears 30 and 32, which move the film sprocket 36 (Fig. 3) by means of the shaft 34. In the same manner, when clutch 146 is engaged with idler gear 140, the train of gears 142 and 144 moves to turn the film sprocket 147 by means of the shaft 145 (both shown in Fig. 3). Independent action is thereby achieved for all three film transport mechanisms, so that each may be operated successively or simultaneously with any of the other mechanisms.

In Fig. 3 the condensing lens 62 is used to illuminate uniformly the film 64, passing through the curved gate 66, with light from a source 60. Via one of the mirrors 10, the light passing through the film 64 reaches the lenses 68 and is focused onto the screen of the television camera tube 70. Tube 70, of course, may be connected to a suitable television transmitter circuit.

Cathode ray tube 110 may have a low persistence screen scanned by an electron beam in a raster pattern. An image of the flying spot resulting is focused onto the motion picture film 114, via one of the mirrors 10, by the lenses 112. Light passing through the film 114 is directed onto the plate 117 of the photo-multiplier 116 by the lens 115. The photo-multiplier 117 may also be connected to a suitable television transmitter circuit. By simply using unexposed motion picture film for 114, and by making 110 the picture tube of a television receiver, this system may also be used to record television images on film at twenty-four pictures per second.

Light from the source 150 is directed through the film 158 in the curved gate 156 by the lens 152 and is reflected toward the lenses 160, via one of the mirrors 10. An image of the film 156 is focused onto a screen 162 by the lenses 160.

The cam 120 is provided with three symmetrically arranged special contours, instead of two. Since the special surface need never be longer than a certain minimum length, increasing the circumference of the cam makes it possible to grind a large number of such symmetrically arranged special surfaces onto a single cam. A corresponding number of image projection systems may then be arranged about the cam and mirror drum. The grinding of such special surfaces is discussed in the above-mentioned publication.

Various combinations of the image projection systems described above in conjunction with the various illustrative specific embodiments of the invention will occur to those skilled in the art. Applicant does not intend to limit the scope of his invention to the few embodiments represented in the drawings.

What is claimed is:

1. Optical apparatus for simultaneously imaging $n$ independently moving motion picture films passing respectively through $n$ associated image projection systems comprising a single common rotatable drum, a plurality of pivots mounted on said single common rotatable drum for oscillation about individual axes during rotation of said single common rotatable drum, a plane mirror fixedly mounted on each of said pivots, the axis of each of said pivots being positioned parallel to the plane of its mirror and parallel to the axis of rotation of said single common rotatable drum, a single common stationary cam positioned in close proximity to said rotatable drum, said single common stationary cam having $n$ special curves symmetrically located along its periphery at $\frac{360°}{n}$ intervals about said axis of rotation of said single common rotatable drum, a cam follower fixed to each pivot and positioned in following relationship with said single common stationary cam and disposed to roll on the periphery of said single common stationary cam, whereby each pivot and its mirror passes through an oscillation as said cam follower rolls on each special peripheral curve portion of said common stationary cam, the character of each said oscillations being determined by said special peripheral curves, $n$ independent image projection systems each comprising a source of light, a film gate, and means for simultaneously directing light from said sources through said film gates, respectively, to selected ones of said mirrors at points where the cam follower associated with each of said selected mirrors is guided by one of said special curves, thereby to oscillate said mirrors, said last-mentioned means including a train of lenses associated with each of said independent image projection systems, and means associated with each one of said independent image projection systems for operating it in synchronism with said single common rotatable drum independently of said other systems.

2. Optical apparatus as defined in claim 1 in which there are two of said special curves along the periphery of said single common stationary cam, and two image projection systems each comprising a light source originating an optical path in which there are located, in order from the light source, a first lens system, a film gate, one of said plurality of plane mirrors, a second lens system, and a television sending device, and means for moving image-bearing film continuously through the film gate.

3. Optical apparatus as defined in claim 1 in which there are two of said special curves along the periphery of said single common stationary cam, and two image projection systems each comprising a television picture-receiving device originating an optical path in which there are located, in order from the television picture-receiving device, a first lens system, one of said pivots and the plane mirror mounted thereon, a film gate, a second lens system, and a photo-multiplier, and means for moving unexposed, light-sensitive film continuously through the film gate.

4. Optical apparatus as defined in claim 1 in which there are three of said special curves along the periphery of said single common stationary cam, and three image projection systems, a first image projection system comprising a light source originating an optical path in which there are located, in order from the light source, a first lens system, a film gate, one of said pivots and the plane mirror mounted thereon, a second lens system, and a television sending device, and means for moving image-bearing film continuously through the film gate; a second image projection system comprising a television picture-receiving device originating an optical path in which there are located, in order from the television picture-receiving device, a first lens system, one of said pivots and the plane mirror mounted thereon, a film gate, a second lens system, and a photomultiplier, and means for moving unexposed, light sensitive film continuously through the film gate; and a third image projection system comprising a light source originating an optical path in which there are located, in order from the light source, a first lens system, one of said pivots and the plane mirror mounted thereon, a film gate, a second lens system, and a screen, and means for moving image-bearing film continuously through the film gate.

References Cited in the file of this patent

UNITED STATES PATENTS 2,622,147    Condliffe _____ Dec. 16, 1952

U. S. DEPARTMENT OF COMMERCE

PATENT OFFICE

CERTIFICATE OF CORRECTION

Patent No. 2,831,055     Charles F. Mattke           April 15, 1958

It is hereby certified that error appears in the printed specification of the above numbered patent requiring correction and that the said Letters Patent should read as corrected below.

Column 6, line 5, for "plurality of plane mirrors," read --pivots and the plane mirror mounted thereon,--.

Signed and sealed this 1st day of July 1958.

(SEAL)
Attest:
KARL H. AXLINE

Attesting Officer

ROBERT C. WATSON
Commissioner of Patents